United States Patent Office 3,049,606
Patented Aug. 14, 1962

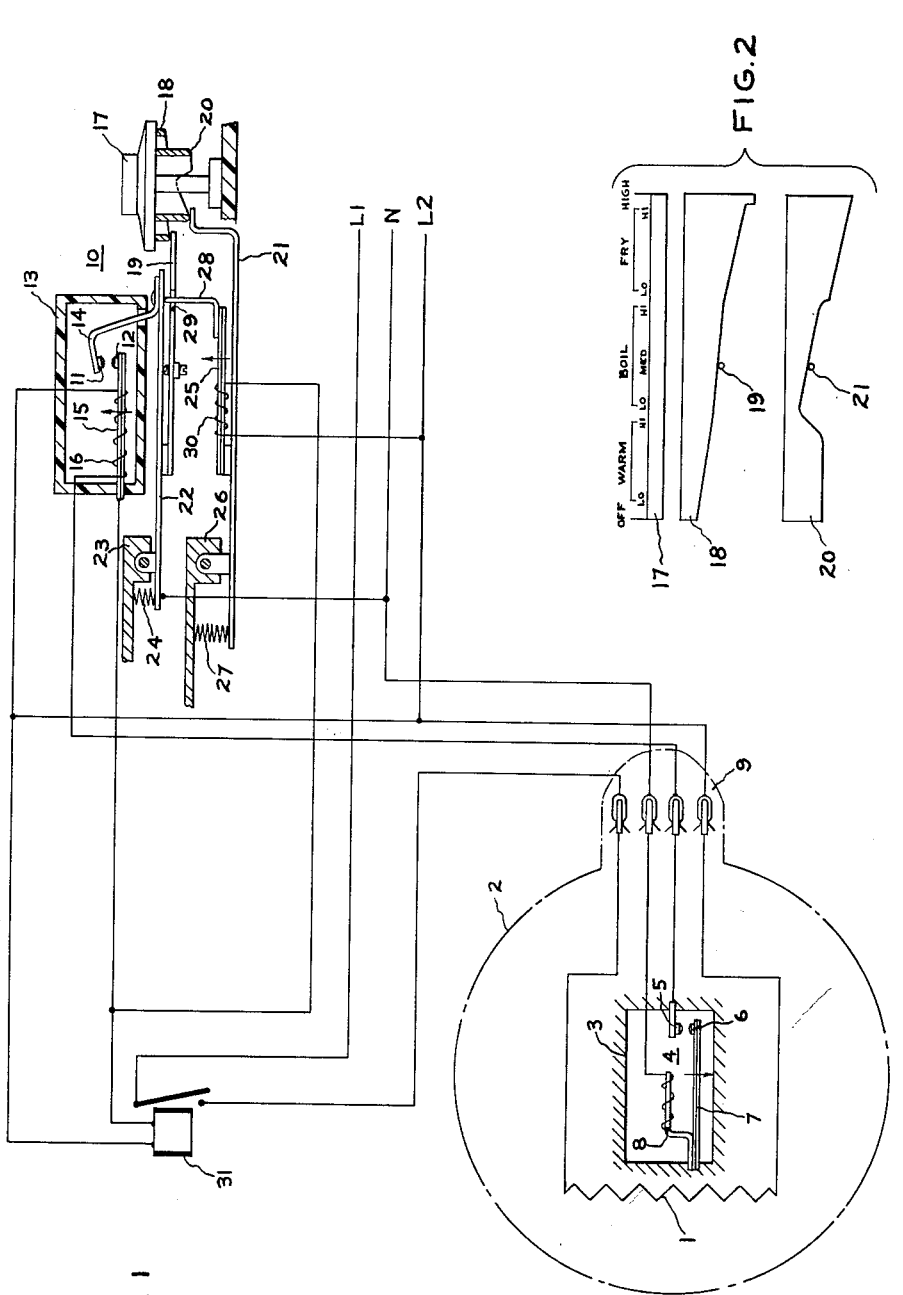

3,049,606
HEAT CONTROL SYSTEM FOR COOKING
APPARATUS
Walter R. Weeks, Louisville, Ky., assignor to General
Electric Company, a corporation of New York
Filed Dec. 4, 1957, Ser. No. 700,618
1 Claim. (Cl. 219—20)

This invention relates to heat control systems, and more particularly to a heat control system especially suitable for controlling the temperature of an electrically heated cooking utensil.

One of the objects of this invention is to provide an improved manually variable control system for regulating the power input to an electric heating unit in accordance with the temperature of a cooking utensil heated by the heating unit.

Another object of the invention is to provide a heat control system for electrically heated cooking utensils adapted to provide heat regulation during boiling operations as well as temperature regulation throughout the range of temperatures utilized in surface cooking.

Further objects and advantages of the invention will become apparent as the following description proceeds, and the features of novelty which characterize the invention will be pointed out with particularity in the claim annexed to and forming a part of this specification.

Briefly stated, in accordance with one aspect of this invention I provide an electric heating unit arranged to heat a cooking utensil, a temperature sensing device arranged to transmit a control signal which is a function of the difference between a pre-selected temperature and the actual temperature of the utensil being heated, switch contacts arranged to regulate the supply of power to the heating unit, means for actuating the switch contacts in accordance with the control signal, and independent means operable within a predetermined temperature range for actuating the switch contacts toward open circuit position each time the contacts close.

For a better understanding of the invention reference may be made to the following description and the accompanying drawing in which:

FIG. 1 is a diagrammatic view of a control system embodying my invention.

FIG. 2 is a developed view of the control knob and cam arrangement illustrated in FIG. 1.

Referring to the drawing, the numeral 1 designates an electric heating unit which is associated in heat transfer relation with a cooking utensil 2 including a wall portion 3 having a cavity or enclosure 4 therein in which is housed the temperature sensing device which forms a part of the present invention. Mounted within enclosure 4 are a pair of switch contacts 5 and 6, the latter being mounted on a bimetallic blade 7 so that the contacts are actuated between open and closed position in accordance with the temperature of bimetal blade 7. Also mounted within the enclosure is an electric heater 8 in heat transfer relation with bimetal actuator 7, it being apparent that the actuator 7 will receive heat from two sources, namely, the wall member 3 of the utensil and heater 8. Preferably heater 8 is not located in direct contact with actuator 7 so that the response of the actuator is slightly delayed, thus providing a gap between the temperatures at which contacts 5 and 6 open and close. In this way contact chatter may be minimized.

Contacts 5 and 6 and heater 8 are connected in series to a source of electric power, so that the heater is energized when the contacts close and is de-energized when the contacts open. Inasmuch as bimetal actuator 7 is arranged to move in the direction illustrated by the arrow as its temperature increases, it will be seen that contacts 5 and 6 cycle between open circuit position and closed circuit position inasmuch as the heat received from heater 8 tends to re-open the contacts each time they close. Contacts 5 and 6 are spaced and arranged so as to maintain bimetal actutor 7 at a temperaure somewhat higher (600° F., for example) than the maximum temperature attained by cooking vessel 2 during cooking operations. In other words, using the aforementioned exemplary temperature, contacts 5 and 6 may be set to open when the temperature of actuator 7 rises to 610° F., and to close when its temperature drops to 590° F.

From the description thus far, it will be seen that if the heat being transmitted to bimetal actuator 7 from wall 3 of cooking utensil 2 is relatively high, the heat required from heater 8 to maintain the desired temperature of 600° on the actuator will be relatively low, and vice versa. In other words, when cooking utensil 2 is relatively hot, the average power resulting from the current flowing through heater 8 will be relatively low, while when the temperature of utensil 2 is low the average power generated in heater 8 will be relatively high.

Th energization of heating unit 1 may, if desired, be controlled from a remote location, and accordingly in the illustrated embodiment of the invention a multi-conductor cord plug 9 may be utilized to connect the power and control circuits of the utensil to power supply lines L1, L2, and the neutral line N of a three-wire system, and to a manually operable control device which, for example, may be located in the backsplasher of a kitchen cabinet or the like. Alternatively, the entire control system may be made a unitary part of utensil 2 in which case a handle (not shown) or other part of the utensil may be utilized to house the control components. Furthermore, it will be understood that the heating unit and control system may be energized from a two wire power supply, if desired.

A manually adjustable control device generally designated by the numeral 10 is utilized to control the supply of power to heating unit 1 in utensil 2. Control device 10 includes a pair of contacts 11 and 12 which function to cause energization of heating unit 1 when they are closed and to de-energize heating unit 1 when they are open, contacts 11 and 12 preferably being mounted within an enclosure 13 and supported on a movable arm 14 and a bimetal actuator 15 respectively. Bimetal actuator 15 is arranged to actuate contact 12 toward contact 11 when its temperature is increasing, and is adapted to receive heat from an electric heater 16 associated therewith in heat transfer relationship.

The various temperature settings utilized in cooking operations may be manually selected by varying the position of contact 11, and for this purpose there is provided a control knob 17 having a cam surface 18 cooperating with movable arm 19 which is operatively associated with contact carrying arm 14, and also a cam surface 20 arranged to cooperate with an arm 21 operatively associated with arm 14. Cam follower arm 19 is fixedly secured to the mid-portion of movable arm 22 which is pivotally mounted to a fixed support 23. Arm 14 is fixedly secured to the free end of arm 22, and the unitary assembly of which arm 22 is a part is biased in a counterclockwise direction, as viewed in the drawing, by a spring 24 so that the free end of arm 19 bears against cam surface 18.

A bimetallic arm 25 is fixedly secured to cam follower arm 21 which is pivotally mounted on a fixed support 26 and biased in a counterclockwise direction by a spring 27, so as to bias the free end of arm 21 against cam surface 20. Bimetal arm 25 carries on one end an upwardly projecting finger 28 arranged to extend through an opening 29 in arm 19 and to engage the free end of arm 22. An electric heater 30 is arranged in heat transfer relation with bimetal arm 25, and the latter is constructed and arranged so as to move in the direction indicated by the arrow each time heater 30 is energized.

As best shown in FIG. 2, in which control knob 17 is shown in developed form, cam 18 is arranged so as to cause arm 19, and hence contact 11 to move downwardly (as viewed in the drawings) as the control knob is rotated from the off position toward the high heat position. It will be seen that cam 18 includes three sections of varying slope, corresponding to the warm, boil, and fry ranges respectively. In the section corresponding to the warm range, the slope of the cam surface is such that contact 11 may be adjusted so as to provide temperatures ranging from approximately 50° F. at the off position to approximately 200° F. at the high warm position; at the section corresponding to the boil range is of lesser slope and provides temperatures ranging from approximately 210° F. to 235° F.; and the slope of the cam surface section corresponding to the fry range again increases in slope so as to provide a range of temperatures from approximately 240° F. to 400° F.

In the illustrated form of my invention, cam 20 is arranged so as to hold arm 21 in a position such that finger 28 cannot engage arm 22 and thus effect movement of contact 11 (even when heater 30 is energized) in the warm range and also in the fry range. In other words, when arm 21 engages either the cam section corresponding to the warm range or the cam section corresponding to the fry range finger 28 which is fixed to bimetal 25 is spaced from arm 22 a distance sufficient to prevent its engagement therewith even when warped upwardly to its uppermost position by heat received from heater 30. However, it will be understood that actuation of contact 11 by bimetal arm 25 need not be limited to the boil range of control knob settings, but may be extended to the fry range, for example, if some temperature anticipation is desired.

When control knob 17 is positioned at any point in the boil range, arm 21 is positioned by the cam section corresponding thereto so that finger 28 can engage arm 22 and thus periodically actuate contact 11, thus providing means for regulating the heat input to utensil 2 even though the temperature thereof remains substantially constant. The slope of the cam section corresponding to the boil range of knob positions is such that contacts 11 and 12 are closed during approximately 20% of each cycle when knob 17 is positioned in low boil position and are closed during approximately 80% of each cycle in the high boil position.

In the illustrated embodiment of my invention, contacts 11 and 12 are connected in series with the coil of a relay 31 arranged to control the power supply to heating unit 1, the contacts of relay 31 being connected in series with heating unit 1 and functioning to connect the heating unit to power supply lines L1, L2. Thus each time contacts 11 and 12 close, power is supplied to the heating unit and heat is supplied to the cooking utensil 2. However, it will be understood that relay 31 may be eliminated if it is desired to connect heating unit 1 directly in series with contacts 11 and 12.

Heater 30 is also arranged to be energized each time contacts 11 and 12 close, being connected in parallel with the coil of relay 31. Thus it will be seen that heater 30 is energized simultaneously with heating unit 1, and when control knob 17 is positioned in the boil zone, heater 30 causes bimetal arm 25 to move in the direction indicated by the arrow so as to eventually open the contacts 11 and 12. It will be observed that the portion of the control circuit including the coil of relay 31 and heater 30 are energized at relatively low voltage through power supply line L2 and the neutral line N. Heater 8 in the sensing device in cooking utensil 2, and heater 16 in the control device 10 are connected in series in a low voltage control circuit including contacts 5 and 6 which regulate the flow of current supplied through power supply line L2 and the neutral line N. Thus each time the contacts 5 and 6 close, heaters 8 and 16 are energized simultaneously. As previously explained, bimetal actuator 7 operates contact 6 so as to maintain itself at a temperature of approximately 600° F., and heater 8 functions to supply the heat required to make up the difference between the temperature of utensil 2 and 600° F. Hence the current pulses required to supply this additional heat perform the function of a control signal indicating the difference between 600° F. and the temperature of the utensil. This signal is received by control device 10 and power supplied by heater 16 supplies heat for positioning bimetal actuator 15 in a position corresponding to the temperature of utensil 2.

From the foregoing description it will be evident that when control knob 17 is positioned within either the warm range or the fry range heater 16 will be periodically energized as signal contacts 5 and 6 open and close, and hence contacts 11 and 12 will be opened and closed in an on-off cycle, determined by the exact position of knob 17, so as to regulate the power supplied to heating unit 1 and hence the temperature of utensil 2. When control knob 17 is positioned in the boil range and utensil 2 contains water the temperature of the utensil will reach the boiling point and remain there. Thus bimetal actuator 15 cannot control the energization of heating unit 1 so as to provide various heating rates, since the heat supplied by wall portion 3 of the utensil to bimetal actuator 7 remains substantially constant. However, contacts 11 and 12 will be closed when knob 17 is in the boil range except when contact 11 is moved out of engagement with contact 12 by movement of finger 28 resulting from the heating of bimetal arm 25 by heater 30. Thus when a boiling operation is performed, bimetal actuator 15 will initially assume a position corresponding to the relatively low temperature of utensil 2 and will move contact 12 upwardly into engagement with contact 11 thus energizing heating unit 1. When the boiling point is reached contact 12 will be moved downwardly by bimetal actuator 15 to a position corresponding to this temperature, and thereafter contacts 11 and 12 will be actuated between open and closed positions by bimetal arm 25 since heater 30 is energized each time the contacts close. As previously explained, the ratio of contact closed time to contact open time of contacts 11 and 12 will depend upon the exact setting within the boil range of cam 20 with respect to cam follower 21, the ratio varying from 20% "on" time at low boil to 80% "on" time at high boil.

In summary, it will be seen that my invention provides a control system in which control contacts 11 and 12 are periodically cycled between open and closed positions by a signal which is a function of the temperature of utensil 2, that the temperature to be maintained in the utensil may be selected by positioning knob 17 so as to vary the range of movement of contact 11, and that in the boil range of knob 17 contact 11 is cycled between open and closed positions by movement of bimetal arm 25 in response to heat supplied by heater 30. Finally, the range of movement of bimetal arm 25 is automatically adjusted during boiling operation so as to provide the various boil rates utilized in cooking operations.

While I have shown and described a particular embodiment of my invention, I do not desire the invention to be limited to the particular arrangement disclosed, and I intend by the appended claim to cover all modifications within the true spirit and scope of my invention.

What I claim is:

A heat control system for a cooking utensil heated by an electric heating unit comprising: a temperature sensing member in heat transfer relation with the utensil, said sensing member including a first pair of contacts, a first bimetal actuator, a first electric heater, and wall means defining an enclosure therefor, said first bimetal actuator being arranged to open said first pair of contacts in response to an increase in temperature to a predetermined level above the maximum cooking temperature of said utensil and to close said first pair of contacts in response to a decrease in temperature below said predetermined level, said first heater and said first pair of contacts being connected in series in a circuit adapted to be energized by an electric power source; a manually operable temperature selector member including a second pair of contacts for regulating the supply of electric power to said heating unit, a second bimetal actuator arranged to move one of said second pair of contacts toward the other contact in response to a predetermined increase in temperature, a second electric heater in heat transfer relation with said second bimetal actuator, manually operable means for varying the position of one of said second pair of contacts, a third bimetal actuator arranged to open said second pair of contacts in response to a predetermined temperature increase, manually operable means for varying the range of movement of said third bimetal actuator whereby its effectiveness to actuate said second pair of contacts may be limited to a predetermined range of utensil temperatures, a third electric heater in heat transfer relation with said third bimetal actuator; and electric circuit means including means connecting said second heater in series with said first heater, means connecting said third heater in series with said second pair of contacts whereby the energization of said third heater is controlled thereby, and relay means in series with said second pair of contacts, said relay means being connected in circuit with said heating unit so as to control the supply of power thereto, whereby said first and second heaters are energized and de-energized simultaneously and said second pair of contacts are opened and closed in accordance with the temperature of said sensing member and the setting of said manually operable means.

References Cited in the file of this patent

UNITED STATES PATENTS

| | | |
|---|---|---|
| 2,302,603 | Davis et al. | Nov. 17, 1942 |
| 2,727,973 | Collins | Dec. 20, 1955 |
| 2,816,203 | Weeks | Dec. 10, 1957 |
| 2,819,371 | Aldrich et al. | Jan. 7, 1958 |